United States Patent
Yamada

(10) Patent No.: US 7,835,728 B2
(45) Date of Patent: Nov. 16, 2010

(54) VOICE PROCESSING UNIT AND SYSTEM, AND VOICE PROCESSING METHOD

(75) Inventor: Eiko Yamada, Tokyo (JP)

(73) Assignee: NEC Corporation, Tokyo (JP)

( * ) Notice: Subject to any disclaimer, the term of this patent is extended or adjusted under 35 U.S.C. 154(b) by 1097 days.

(21) Appl. No.: 10/593,041

(22) PCT Filed: Mar. 18, 2005

(86) PCT No.: PCT/JP2005/004959

§ 371 (c)(1),
(2), (4) Date: Sep. 15, 2006

(87) PCT Pub. No.: WO2005/091128

PCT Pub. Date: Sep. 29, 2005

(65) Prior Publication Data

US 2007/0143102 A1  Jun. 21, 2007

(30) Foreign Application Priority Data

Mar. 18, 2004  (JP) .............................. 2004-079078

(51) Int. Cl.
*H04L 29/08*  (2006.01)
(52) U.S. Cl. ................. 455/414.4; 455/414.3; 370/370; 370/372; 370/395.3
(58) Field of Classification Search ............... 379/88.17; 370/352–356, 370, 372, 395.3; 455/414.3, 455/414.4
See application file for complete search history.

(56) References Cited

U.S. PATENT DOCUMENTS 5,717,740 A * 2/1998 Penning et al. .......... 379/88.02

(Continued)

FOREIGN PATENT DOCUMENTS

JP  2000-040051 A  2/2000

(Continued)

OTHER PUBLICATIONS

Nakagawa, "Voice Recognition by Probability Model", IEICE, pp. 10-12.

*Primary Examiner*—Simon Sing
(74) *Attorney, Agent, or Firm*—Whitham Curtis Christofferson & Cook, PC

(57) ABSTRACT

A client (10) transmits a service request signal to a Web server (20). The Web server which has received the service request signal generates an ID for each session, and transmits the ID to the client together with window information. The client then transmits input voice information to a voice processing server (30) together with the ID. The voice processing server which has received the voice information and the ID processes the voice information, and transmits the processing result to the Web server together with the ID. The Web server prepares information reflecting the voice processing result obtained by the voice processing server in correspondence with the ID from the voice processing server, and transmits the information to the client. Letting the client, Web server, and voice processing server share an ID for each session in this manner allows the server side to comprehend the relationship between the information downloaded from the Web server to the client and the voice information transmitted from the client to the voice processing server. As a consequence, even if the Web server and the voice processing server receive access from a plurality of clients, proper information reflecting the voice processing result can be downloaded.

24 Claims, 9 Drawing Sheets

U.S. PATENT DOCUMENTS 5,915,001 A * 6/1999 Uppaluru .................. 379/88.22
6,636,596 B1 * 10/2003 Gallant et al. ........... 379/220.01
6,654,722 B1 * 11/2003 Aldous et al. ............. 704/270.1

FOREIGN PATENT DOCUMENTS

| JP | 3452250 B | 9/2001 |
|---|---|---|
| JP | 2002-359688 A | 12/2002 |
| JP | 2003-005949 A | 1/2003 |
| JP | 2003-125109 A | 4/2003 |

* cited by examiner

VOICE PROCESSING UNIT AND SYSTEM, AND VOICE PROCESSING METHOD

TECHNICAL FIELD

The present invention relates to a voice processing technique and, more particularly, to a system, unit, and method which transmit voice information input on a terminal (client) side to a voice processing unit through a network and process the information.

BACKGROUND ART

As a conventional system of this type, there is known a technique which makes a cell phone terminal (client) phone-connect to a voice processing server by using a phone-to function or the like, performs voice processing (voice recognition, speaker collation, and the like) for voice uttered by a user, transmits the result from the voice processing server to a Web server, makes the Web server generate a window reflecting the processing result, and makes the cell phone terminal download and display the window, thereby associating voice processing with window within this framework (see, for example, Japanese Patent No. 3452250 (reference 1)). As shown in FIG. 1, in this conventional system, a cell phone terminal 11 and a voice processing server 13 transmit/receive data through a circuit switched network 15, and the cell phone terminal 11 and a Web server 12 transmit/receive data through a packet network 14.

If the Web server 12 and the voice processing server 13 have received access from a plurality of cell phone terminals 11, a technique of comprehending the relationship between a window downloaded from the Web server 12 to the cell phone terminal 11 and voice data transmitted from the cell phone terminal 11 to the voice processing server 13 is necessary to make the cell phone terminal 11 reflect a voice processing result in the window and display it.

The conventional system shown in FIG. 1 is configured to allow the Web server 12 and the voice processing server 13 to uniquely comprehend a terminal which downloads window information and a terminal which transmits voice data by associating the terminal ID of the cell phone terminal 11 with a cell phone terminal number.

There is also known a technique of transmitting feature vectors and voice information such as compressed voice data from a client such as a portable digital assistant (PDA) or on-vehicle terminal to a voice processing server through a packet network so as to perform voice processing (voice recognition, speaker collation, and the like) (see, for example, Japanese Patent Laid-Open No. 2003-5949 (reference 2)).

The system disclosed in reference 2 can operate contents designed to display a processing result in the form of a table and display the result obtained by a search based on a processing result in a window. Disclosure of Invention

PROBLEM TO BE SOLVED BY THE INVENTION

The system disclosed in reference 2 requires a technique of allowing a server side to comprehend the relationship between a window downloaded to a client and voice data transmitted from the client even within a framework for voice processing which is designed to transmit/receive data through a packet network.

The conventional technique disclosed in reference 1 is a method of associating a phone number with the terminal ID of a cell phone terminal, and hence is a technique which cannot be used in the above framework for voice processing which uses a packet network which does not require any phone numbers. This makes it necessary to use a new technique of allowing the server side to comprehend the relationship between a window downloaded to a client and voice data transmitted from the client in a framework for voice processing in which data is transmitted/received between the client, a voice processing server, and a Web server through a packet network.

It is, therefore, an object of the present invention to allow a server side to comprehend the relationship between information downloaded from an information providing server (information providing unit) such as a Web server to a client (terminal) and voice information transmitted from the client to a voice processing server (voice processing unit).

It is another object of the present invention to download proper information reflecting a voice processing result even if a voice processing server and an information providing server receive access from a plurality of clients.

MEANS OF SOLUTION TO THE PROBLEM

In order to achieve this object, according to the present invention, there is provided a voice processing system characterized by comprising a terminal which transmits input voice information and outputs received information, a voice processing unit which performs voice processing on the basis of voice information from the terminal, and an information providing unit which receives a voice processing result obtained by the voice processing unit and transmits information reflecting the voice processing result to the terminal, wherein the terminal, the voice processing unit, and the information providing unit share processing identification information corresponding to a series of processes performed by the voice processing unit and the information providing unit on the basis of the voice information.

In addition, according to the present invention, there is provided a voice processing method characterized by comprising the steps of causing a terminal to transmit input voice information to a voice processing unit, causing the voice processing unit to perform voice processing for the voice information from the terminal, transmitting a voice processing result to an information providing unit, and causing the information providing unit to prepare information reflecting the voice processing result obtained by the voice processing unit, and the step of transmitting the prepared information to the terminal, wherein the terminal, the voice processing unit, and the information providing unit share processing identification information corresponding to a series of processes performed by the voice processing unit and the information providing unit on the basis of the voice information.

According to the present invention, there is provided an information providing server unit characterized by comprising first reception means for receiving a service request signal from a client, identification information generating means for generating processing identification information corresponding to a series of processes performed on the basis of voice information from the client when the service request signal is received, means for generating first information to be presented to the client on the basis of the processing identification information, first transmission means for transmitting the processing identification information and the first information to the client, second reception means for receiving a voice processing result and the processing identification information from a voice processing server which performs voice processing upon receiving the voice signal and the processing identification information from the client, means for generating second information reflecting the voice processing result in correspondence with the processing identification information from the voice processing server, and second transmission means for transmitting the second information to the client.

According to the present invention, there is provided a client unit characterized by comprising unique identification information output means for outputting unique identification information of the client unit as processing identification information corresponding to a series of processes performed by a voice processing server which performs voice processing for voice information from the client unit and an information providing server which transmits information reflecting a voice processing result obtained by the voice processing server to the client unit, first transmission means for transmitting a service request signal and the processing identification information to the information providing server when a service request is issued, and second transmission means for transmitting the input voice information to the voice processing server together with the processing identification information.

According to the present invention, there is provided a voice processing server unit characterized by comprising first reception means for receiving a voice processing request signal from a client, identification information generating means for generating processing identification information corresponding to a series of processes performed on the basis of voice information from the client when the voice processing request signal is received, first transmission means for transmitting the processing identification information to the client, second reception means for receiving the voice information and the processing identification information from the client, voice processing executing means for performing voice processing for the voice information from the client, and transmission means for transmitting, to an information providing server, a voice processing result obtained by the voice processing executing means and the processing identification information from the client, while generating information reflecting the voice processing result in correspondence with the processing identification information.

A program according to the present invention is a program for causing a computer forming the above information providing server unit, the above client unit, or the above voice processing server unit to implement the functions of the respective units.

An information processing system according to the present invention is characterized by comprising a client and a plurality of servers, wherein a series of processes (A), (B), and (C):

(A) in association with processing executed by at least one of the plurality of servers on the basis of a request from the client, processing is performed by another server in accordance with the request, (B) exchanging a processing result between another server and one server, and (C) causing one server to generate response information in response to the request on the basis of the processing result are managed by common processing identification information shared by the client, one server, and another server.

EFFECTS OF THE INVENTION

According to the present invention, a client (terminal), a voice processing server (voice processing unit), and an information providing server (information providing unit) share processing identification information corresponding to a series of processes performed by the voice processing server and the information providing server on the basis of voice information, thereby allowing the server side to comprehend the relationship between information downloaded from the information providing server to the client and voice information transmitted from the client to the voice processing server. As a consequence, even if the voice processing server and the information providing server receive access from a plurality of clients, the user can download proper information reflecting a voice processing result.

This makes it possible to provide a content which associates voice processing with a window, e.g., displaying, on a window, the result obtained by performing processing such as a search performed on the basis of voice information uttered by the user or downloading proper information on the basis of voice information uttered by the user.

BEST MODE FOR CARRYING OUT THE INVENTION

The embodiments of the present invention will be described in detail below with reference to the accompanying drawings.

Figure 1:
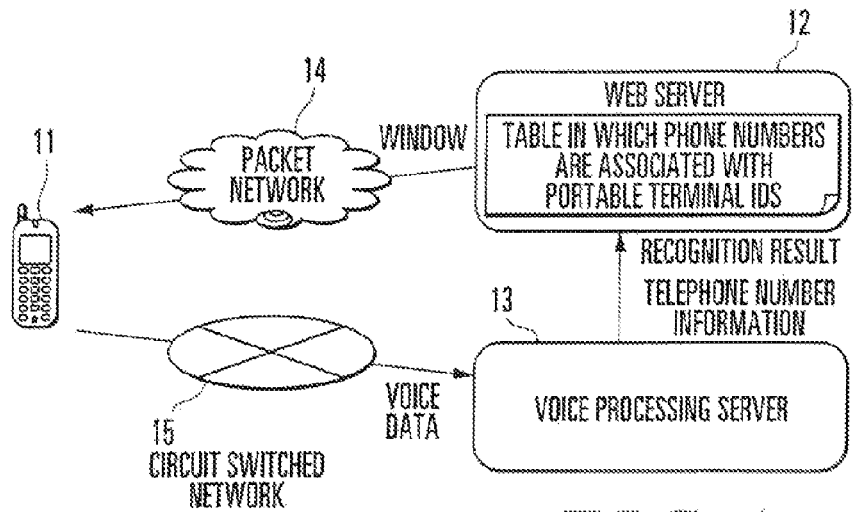
FIG. 1 is a view showing the arrangement of a conventional system.
Figure 2:
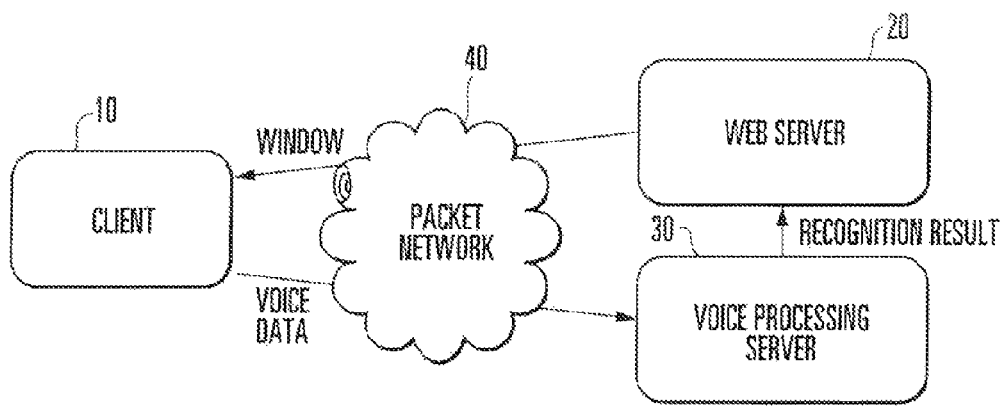
FIG. 2 is a view showing the arrangement of an embodiment of the present invention.

Referring to FIG. 2, according to an embodiment of the present invention, a client (terminal) 10, a Web server (an information providing server or information providing unit) 20, and a voice processing server (voice processing unit) 30 are connected through a network. The client 10 comprises a voice data input unit, a browser function, and a communication function of connecting to a packet network 40 such as an IP network as a network. The client 10, Web server 20, and voice processing server 30 share processing identification information corresponding to a series of processes performed by the Web server 20 and the voice processing server 30 on the basis of voice data. As processing identification information, for example, an ID (to be referred to as a "session ID") assigned in correspondence with a session of utterance processing or a unique ID held by the client 10 is used. Sharing such processing identification information makes it possible to comprehend the correspondence relationship between a window downloaded from the Web server 20 to the client 10 and voice data transmitted from the client 10 to the voice processing server 30.

First Embodiment

Figure 3:
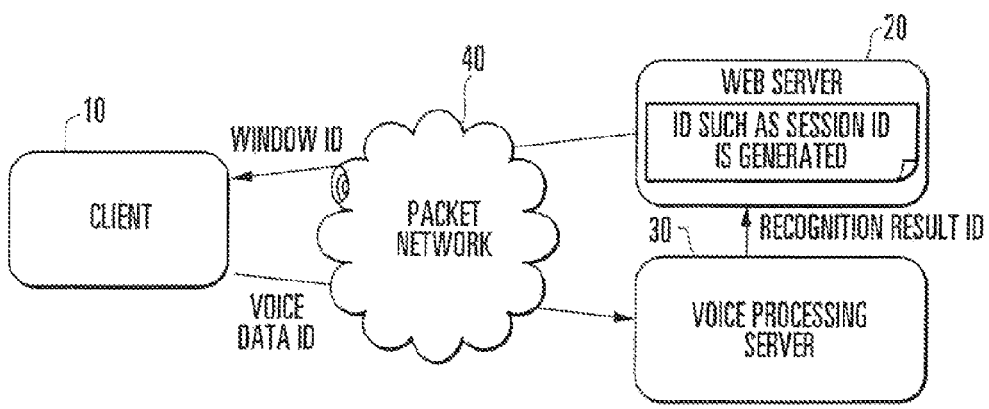
FIG. 3 is a view showing the arrangement of the first embodiment of the present invention.

FIG. 3 is a view showing the arrangement of the first embodiment of the present invention, in which a Web server 20 comprises a session ID generating unit which generates a session ID for each session.

A procedure for processing in this embodiment will be described with reference to FIG. 3. When a client 10 issues a request for a service using voice processing to the Web server 20, the Web server 20 generates a session ID.

When the client 10 downloads window information from the Web server 20, the Web server 20 transmits the generated session ID to the client 10. For example, the session ID may be transmitted while, for example, being contained in window information.

When transmitting the voice information of input voice to a voice processing server 30, the client 10 transmits the session ID received from the Web server 20 to the voice processing server 30. The ID may be transmitted while being contained in the voice information or may be transmitted separately.

The voice processing server 30 performs voice processing (voice recognition, speaker collation, and the like) on the basis of the received voice information. The voice processing server 30 transmits the session ID when transmitting the voice processing result to the Web server 20. A session ID may be transmitted while being contained in a voice processing result.

The Web server 20 can associate the voice processing result obtained by the voice processing server 30 with the client 10 which has issued a service request in accordance with session ID information, and allows the client 10 to download a window reflecting the processing result. In this case, the Web server 20 may be configured to-transmit a window (page) containing voice processing resultant information such as the voice recognition result of an utterance or the like to the client 10 and to download window information corresponding to the voice processing result upon selection from the client 10.

Second Embodiment

Figure 4:
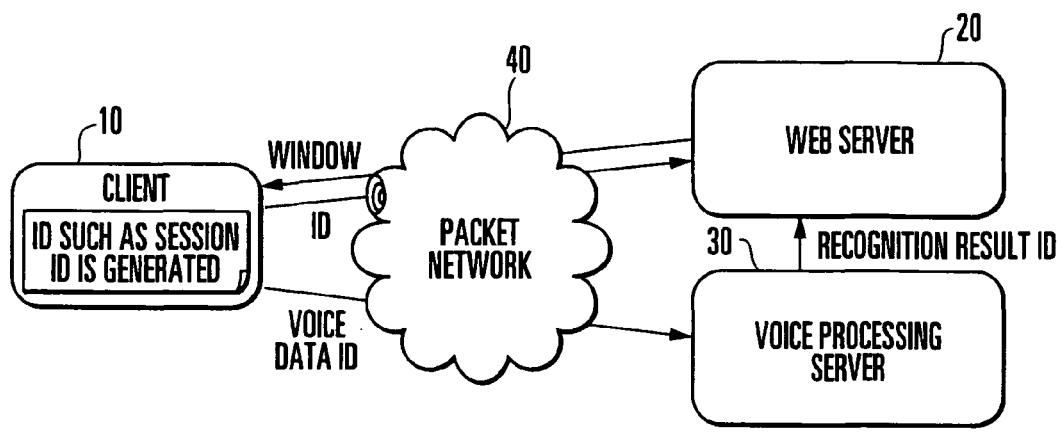
FIG. 4 is a view showing the arrangement of the second embodiment of the present invention.

FIG. 4 is a view showing the arrangement of the second embodiment of the present invention, which comprises an arrangement which uses the ID held by a client 10 as a unique ID. A processing procedure will be described, in a case wherein the ID held in advance by the client 10 is to be used as an ID (unique ID) unique to the client or an ID (unique ID) unique to the client is to be generated by using the ID held in advance by the client 10.

When issuing a request for a service using voice processing to a Web server 20, the client 10 notifies the Web server 20 of the ID held in advance by itself as a unique ID. Alternatively, the client 10 newly generates an ID unique to the client by using the ID held in advance by itself, and notifies the Web server 20 of the generated unique ID. For example, a unique ID may be generated by assigning time stamp information to the ID held in advance by itself.

Subsequently, window information of the requested service is downloaded from the Web server 20 to the client 10.

The window downloaded from the Web server 20 is displayed on a window display unit 140 of the client 10. The client 10 receives the voice signal input from the user and converts it into voice information. When transmitting the voice information to a voice processing server 30, the client 10 also transmits the unique ID.

The voice processing server 30 performs voice processing on the basis of the received voice information. When transmitting the voice processing result to the Web server 20, the voice processing server 30 also transmits the unique ID to the Web server 20.

The Web server 20 receives the voice processing result and the unique ID from the voice processing server 30. The Web server 20 can associate the voice processing result with the client 10, from which the service request has been received, in accordance with the unique ID from the voice processing server 30, and allows the client 10 to download window information reflecting the voice processing result. In this case, the Web server 20 is configured to transmit a window (page) containing the voice processing resultant information such as the voice recognition result on voice and the like to the client 10, and to download window information corresponding to the voice processing result in accordance with selection by the client 10.

Third Embodiment

Figure 5:
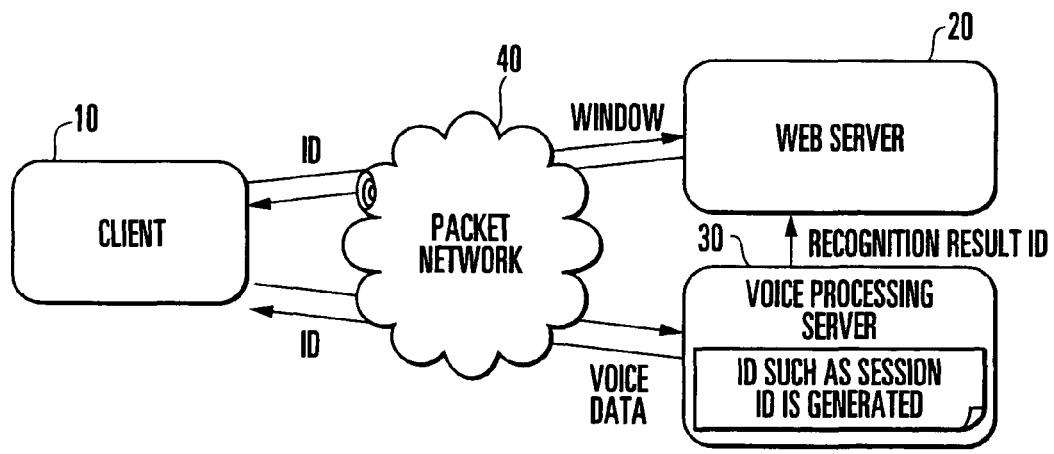
FIG. 5 is a view showing the arrangement of the third embodiment of the present invention.

FIG. 5 is a view showing the arrangement of the third embodiment of the present invention, in which a voice processing server 30 comprises a session ID generating unit which generates a session ID generated for each session. A processing procedure according to this embodiment will be described with reference to FIG. 5. When a client 10 accesses the voice processing server 30 for the transmission of voice information, a session ID generating unit 31 of the voice processing server 30 generates a session ID and notifies the client 10 of it.

The client 10 then notifies a Web server 20 of the received session ID.

The voice processing server 30 performs voice processing on the basis of the voice information received from the client 10. When transmitting the voice processing result to the Web server 20, the voice processing server 30 also transmits the session ID to the Web server 20.

The Web server 20 can associate the voice processing result with the client from which the service request has been received in accordance with the session ID information, and allows the client 10 to download a window reflecting the processing result. In this case, the Web server 20 may be configured to transmit a window (page) containing the voice processing resultant information such as the voice recognition result on voice or the like to the client 10 and to download window information corresponding to the voice processing result upon selection from the client 10.

In the embodiment shown in FIG. 3, the Web server 20 may transmit a session ID to the client 10 in the following manner:

embedding the session ID as tag information in a window (HTML, XML, or the like) or embedding the session ID as header information.

In each embodiment described with reference to FIGS. 3 to 5, the client 10 may transmit a session ID to the voice processing server 30 by the following method:

embedding the session ID as header information in a packet of voice information or embedding the session ID as part of voice information.

In each embodiment described above with reference to FIGS. 3 to 5, the voice processing server 30 may transmit a session ID to the Web server 20 by the following method:

transmitting the session ID as header information of a packet of voice processing resultant information or containing the session ID as part of a voice processing result.

The present invention will be described more in detail by way of specific examples.

FIRST SPECIFIC EXAMPLE

The first specific example of the voice processing system according to the present invention will be described with reference to FIG. 2. The client 10 is connected to the Web server 20 and the voice processing server 30 through the network (packet network) 40. The following can be enumerated as clients: a portable terminal, PDA (Personal Digital Assistant), on-vehicle terminal, PC (Personal Computer), home terminal, and the like. For example, the following can be enumerated as the Web server 20 and the voice processing server 30: a computer installed with Windows XP (registered trademark), Windows 2000 (registered trademark), or the like as an OS (Operating System) and a computer installed with Solaris (registered trademark) as an OS. As the network (packet network) 40, an IP network such as the Internet (wired/wireless) or an intranet is used.

In this specific example, the Web server 20 includes a session ID generating unit which generates a session ID.

Figure 6:
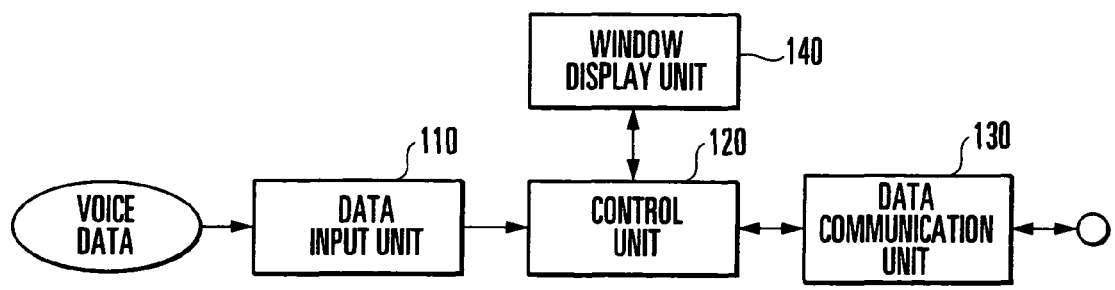
FIG. 6 is a view showing the arrangement of a client according to the first specific example of the present invention.

FIG. 6 is a view showing the arrangement of the client 10 according to the first specific example of the present invention. Referring to FIG. 6, the client 10 comprises a data input unit 110 which functions as a voice input unit and inputs voice data, a window display unit 140, a data communication unit 130, and a control unit 120.

Figure 7:
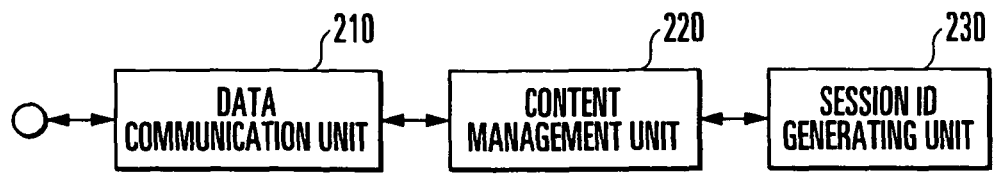
FIG. 7 is a view showing the arrangement of a Web server according to the first specific example of the present invention.

FIG. 7 is a view showing the arrangement of the Web server 20. Referring to FIG. 7, the Web server 20 comprises a data communication unit 210, content management unit (information management means) 220, and session ID generating unit 230.

Figure 8:
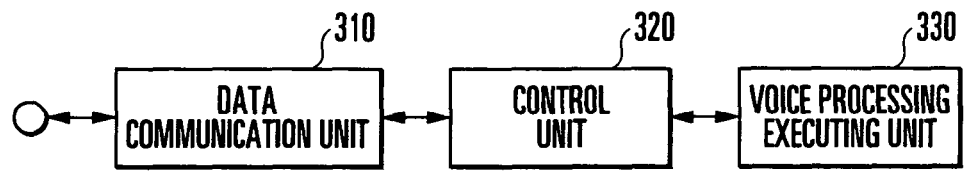
FIG. 8 is a view showing the arrangement of a voice processing server according to the first specific example of the present invention.

FIG. 8 is a view showing the arrangement of the voice processing server 30. Referring to FIG. 8, the voice processing server 30 comprises a data communication unit 310, control unit 320, and voice processing executing unit 330.

Figure 12:
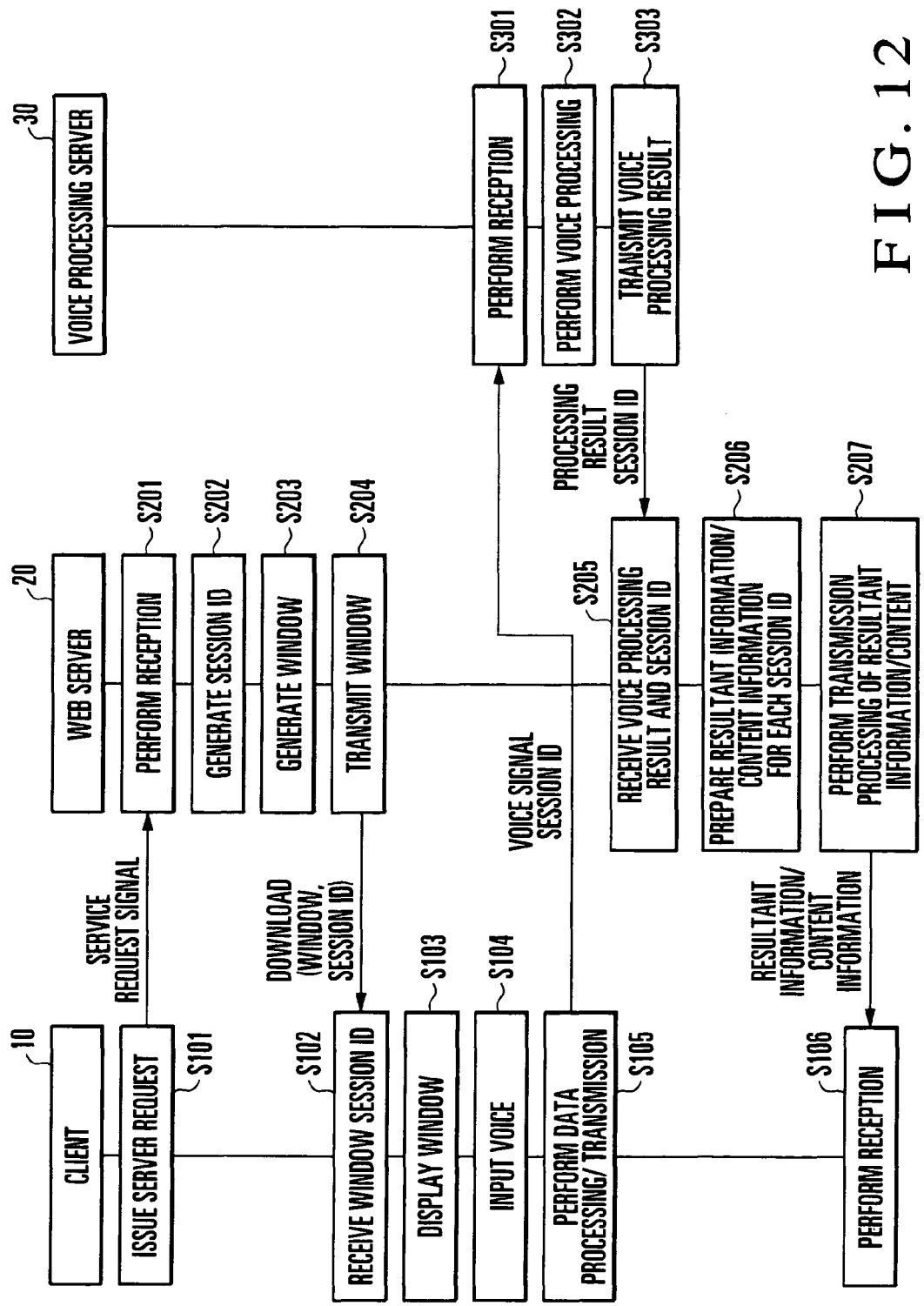
FIG. 12 is a view for explaining the operation of the first specific example of the present invention.

FIG. 12 is a view for explaining the sequence operation of this specific example. The specific example will be described with reference to FIGS. 6 to 8 and 12.

The client 10 issues a request for a service including voice processing to the Web server 20 (step S101). More specifically, when a button on the window displayed on the client 10 is clicked, a service request signal is transmitted to the Web server 20. The Web server 20 then activates a program such as a CGI (Common Gateway Interface) which executes the service.

In the Web server 20, the data communication unit 210 receives the service request signal from the client 10 (step S201), and transmits it to the content management unit 220.

The content management unit 220 checks the service and then transmits the service request signal to the session ID generating unit 230. The session ID generating unit 230 receives the service request signal and generates a session ID (step S202). For example, a session ID may be generated by counting up a predetermined initial value by a value corresponding to an access count.

The generated session ID is transmitted to the content management unit 220. The content management unit 220 generates a window to be downloaded to the client 10 on the basis of the received session ID (step S203). This window may be generated by containing the session ID in URL (Uniform Resource Locator) information linked to a button for result acquisition.

The content management unit 220 of the Web server 20 then downloads the generated window to the client through the data communication unit 210 of the Web server 20 (step S204). At this point of time, the Web server 20 also transmits the session ID to the client 10. The session ID may be transmitted by the following method:

writing the session ID as tag information in the window generated by the Web server 20 or writing the session ID as a header of a packet.

In the client 10, the data communication unit 130 receives the window information and the session ID from the Web server 20 (step S102) and transmits them to the control unit 120 of the client 10. The window information is transmitted from the control unit 120 to the window display unit 140 to be displayed. The window information displayed on the client 10 includes, for example, selection/prompt for voice input or the like by the user.

The voice uttered by the user is input to the data input unit 110 of the client 10 (step S104) and is transmitted to the control unit 120 in the client 10. The control unit 120 of the client 10 performs necessary data processing (step S105). Data processing to be performed includes, for example, digitalization processing for input voice, voice detection processing, voice analysis processing, and voice compression processing. As voice data, for example, digitalized voice data, compressed voice data, or a feature vector is used (for details see Seiichi Nakagawa, "Voice Recognition by Probability Model", THE INSTITUTE OF ELECTRONICS, INFORMATION AND COMMUNICATION ENGINEERS (reference 3), pp. 10-12).

In this data processing, a session ID is contained in voice data. More specifically, this processing may be performed by containing the session ID as header information of a voice data packet or containing the session ID as part of voice data.

The data communication unit 130 sequentially transmits the data processed by the control unit 120 of the client 10 to the voice processing server 30.

In the voice processing server 30, the data communication unit 310 receives the data sequentially transmitted from the client (step S301). If the control unit 320 determines that the received data is voice data, the control unit 320 transmits the data to the voice processing executing unit 330.

The voice processing executing unit 330 comprises at least one of the following (not shown) required for voice processing: a recognition engine, recognition dictionary, synthesis engine, synthesis dictionary, and speaker collation engine, and sequentially performs voice processing (step S302).

Note that the contents of voice processing change depending on the type of data to be transmitted from the client 10. If, for example, the data to be transmitted is compressed voice data, the voice processing executing unit 330 performs decompression of the compressed data, voice analysis, and matching processing. If a feature vector is to be transmitted from the client 10, only matching processing is performed.

When the voice processing is complete, the voice processing executing unit 330 of the voice processing server 30 transmits the voice processing result to the data communication unit 310 through the control unit 320. The data communication unit 310 then transmits the result to the Web server 20 (step S303).

The voice processing result transmitted from the voice processing server 30 to the Web server 20 contains at least one of recognition resultant information, speaker collation information, voice (synthetic voice, voice obtained by converting the input voice, or the like), and the like. At this time, the voice processing server 30 also transmits the session ID to the Web server 20. The session ID may be transmitted by the following method:
- containing the session ID as header information of a packet for the transmission of the voice processing result or
- transmitting the session ID as part of the voice processing result.

In the Web server 20, the data communication unit 210 receives the voice processing result and the session ID (step S205) and transmits them to the content management unit 220.

The content management unit 220 generates, for each session ID, resultant information based on the voice processing result (e.g., voice recognition resultant information; see a window 1003 in FIGS. 15 and 16 (to be described later) or the like) or content information reflecting the voice processing result (a window, voice, moving image, or the like) (step S206).

The Web server 20 downloads the resultant information and a content or only the content, generated for each session ID, to the client 10 which has issued the service request (step S207). The client 10 then receives the downloaded resultant information/content (step S106).

More specifically, at the start of voice processing, a URL linked to a result acquisition button on the window downloaded from the Web server 20 to the client 10 is formed into a URL containing the session ID. The content management unit 220 then places the content information in which the voice processing result is reflected by the Web server 20 at the place represented by the URL containing the session ID. When the user presses the result acquisition button (e.g., the "display map" button on the window 1003 in FIG. 15) of the client 10, the URL containing the session ID is designated, and the content information (e.g., the map window on a window 1004 in FIG. 15) corresponding to this URL is downloaded.

More specifically, this technique can be used for various kinds of processing in, for example, the following cases:
- a case wherein the client 10 interacts with the voice processing server 30,
- a case wherein the voice processing server 30 performs a search or the like by using the voice processing result, or
- a case wherein the Web server 20 performs a search or the like by using the voice processing result.

Note that the processing to be performed by the client 10, Web server 20, and voice processing server 30, which is exemplified by FIG. 12, i.e., the functions of them, may be implemented by programs executed on computers forming the client 10, Web server 20, and voice processing server 30. In addition, the present invention may implement the Web server 20 and the voice processing server 30 on one computer or on remote computers. In this case, when the Web server 20 and the voice processing server 30 exchange IDs, the arguments of a subroutine call may be used. Alternatively, when the Web server 20 and the voice processing server 30 are to exchange variables by inter-process communication, the variables to be exchanged may be those referred to commonly. In addition, in this specific example, the present invention can be applied to a system in which a client which issues a processing request to a server is implemented on the same computer as that on which the server is implemented. That is, the present invention can be applied to an arbitrary management system for executing a request from a client by making a plurality of servers operate in cooperation with each other.

SECOND SPECIFIC EXAMPLE

The second specific example of the present invention will be described next. More specifically, as shown in FIG. 4, when the ID held by the client 10 is to be used as an ID (unique ID) unique to the client, an ID (unique ID) unique to the client is generated by using the ID held in advance by the client.

Figure 9:
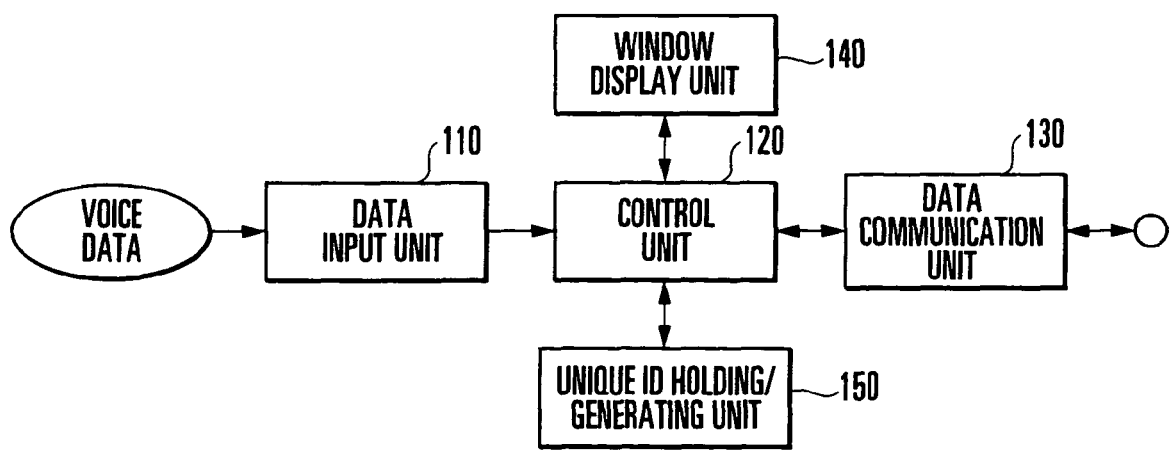
FIG. 9 is a view showing the arrangement of a client according to the second specific example of the present invention.

FIG. 9 is a view showing the arrangement of the client 10 according to the second specific example of the present invention. Referring to FIG. 9, the client 10 comprises a data input unit 110 which functions as a voice input unit and inputs voice data, a window display unit 140, a data communication unit 130, a control unit 120, and a unique ID holding/generating unit (unique identification information output means) 150.

Figure 10:
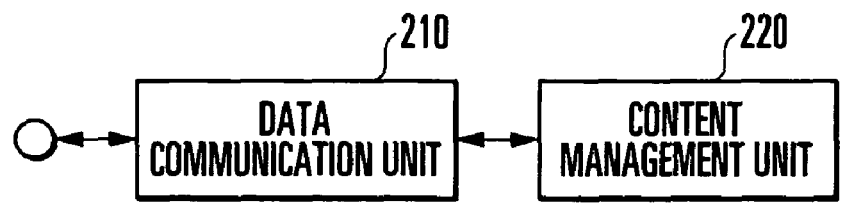
FIG. 10 is a view showing the arrangement of a Web server according to the second specific example of the present invention.

FIG. 10 is a view showing the arrangement of the Web server 20. Referring to FIG. 10, the Web server 20 comprises a data communication unit 210 and a content management unit 220.

The voice processing server 30 has the arrangement shown in FIG. 8, and comprises a data communication unit 310, control unit 320, and voice processing executing unit 330.

Figure 13:
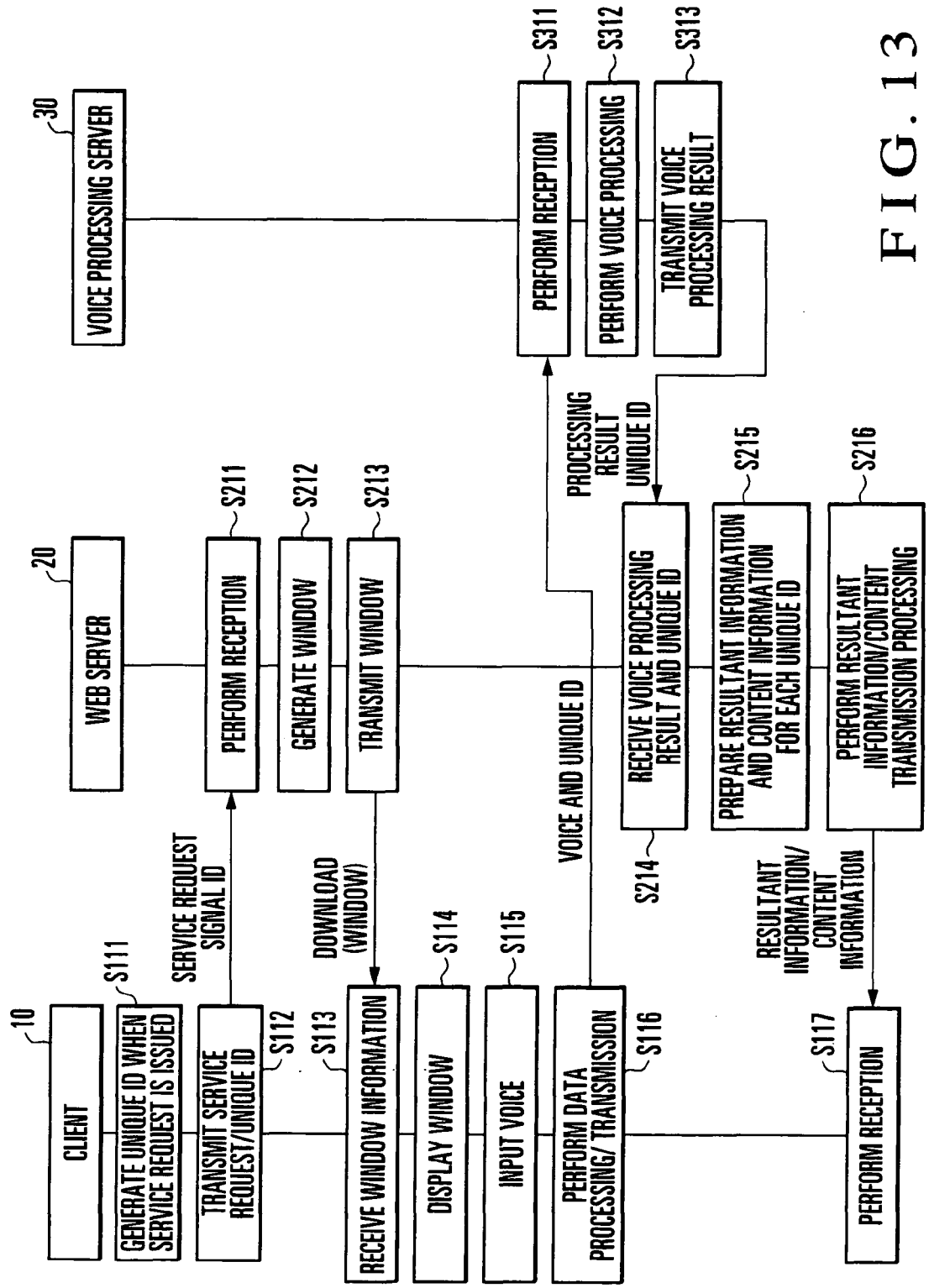
FIG. 13 is a view for explaining the operation of the second specific example of the present invention.

FIG. 13 is a view for explaining the sequence operation of this specific example. The specific example will be described with reference to FIGS. 9, 10, 8, and 13.

When issuing a request for a service using voice processing to the Web server 20, the client 10 transmits, as a unique ID (unique identification information), the ID (terminal identification information) held in advance by the client 10 to the control unit 120 (step S111). Alternatively, in step S111, the unique ID holding/generating unit 150 generates an ID unique to the client by using the ID held in advance and notifies the control unit 120 of the generated unique ID. A unique ID may be generated by assigning time stamp information to the ID held in advance. The control unit 120 receives the service request and the ID and transmits the received unique ID to the Web server 20 through the data communication unit 130 (step S112).

In the Web server 20, the data communication unit 210 receives the service request signal containing the received voice processing and the unique ID (step S211). The data communication unit 210 transmits the service request signal and the unique ID to the content management unit 220.

After checking the service, the content management unit 220 generates a window (first information) to be downloaded to the client 10 by using the received unique ID (step S212). The window may be generated in the following manner (by the following method). As in the above specific example, a session ID is contained in URL (Uniform Resource Locator) information linked to a result acquisition button.

The window generated by the content management unit 220 is downloaded to the client 10 through the data communication unit 210 (step S213).

In the client 10, the data communication unit 130 receives the window information from the Web server 20 (step S113) and transmits the information to the control unit 120. The control unit 120 transmits the window information to the window display unit 140 to display it (step S114).

The voice uttered by the user is input to the data input unit 110 of the client 10 (step S115) and transmitted to the control unit 120. The control unit 120 performs the data processing described in the above specific example. In this data processing, the unique ID is contained in the voice data.

The data communication unit 130 sequentially transmits the processed data to the voice processing server 30 (step S116). The processing of containing the unique ID in the voice data is the same as that in the above specific example.

In the voice processing server 30, the data communication unit 310 receives the sequentially transmitted data (step S311), and the control unit 320 determines that the received data is voice data, and transmits it to the voice processing executing unit 330.

In the voice processing server 30, the voice processing executing unit 330 comprises at least one of the following (not shown) required for voice processing (voice recognition, speaker collation, and the like) as in the above specific example: a recognition engine, recognition dictionary, synthesis engine, synthesis dictionary, and speaker collation engine, and sequentially performs voice processing (step S312). After the voice processing is complete, the voice processing executing unit 330 transmits the voice processing result to the data communication unit 310 through the control unit 320. The data communication unit 310 then transmits the result to the Web server 20 (step S313). At this point of time, the voice processing server 30 transmits the unique ID to the Web server 20. The same transmission method as that in the above specific example is performed.

In the Web server 20, the data communication unit 210 receives the voice processing result and unique ID transmitted from the voice processing server 30 (step S214), and transmits them to the content management unit 220.

The content management unit 220 of the Web server 20 prepares information reflecting the voice processing result (second information: content information corresponding to voice processing resultant information and the voice processing result or content information corresponding to the voice processing result) in correspondence with the unique ID (step S215). The content management unit 220 of the Web server 20 can discriminate the client 10 as the transmission destination of the information reflecting the voice processing result from the unique ID of the client.

Figure 15:
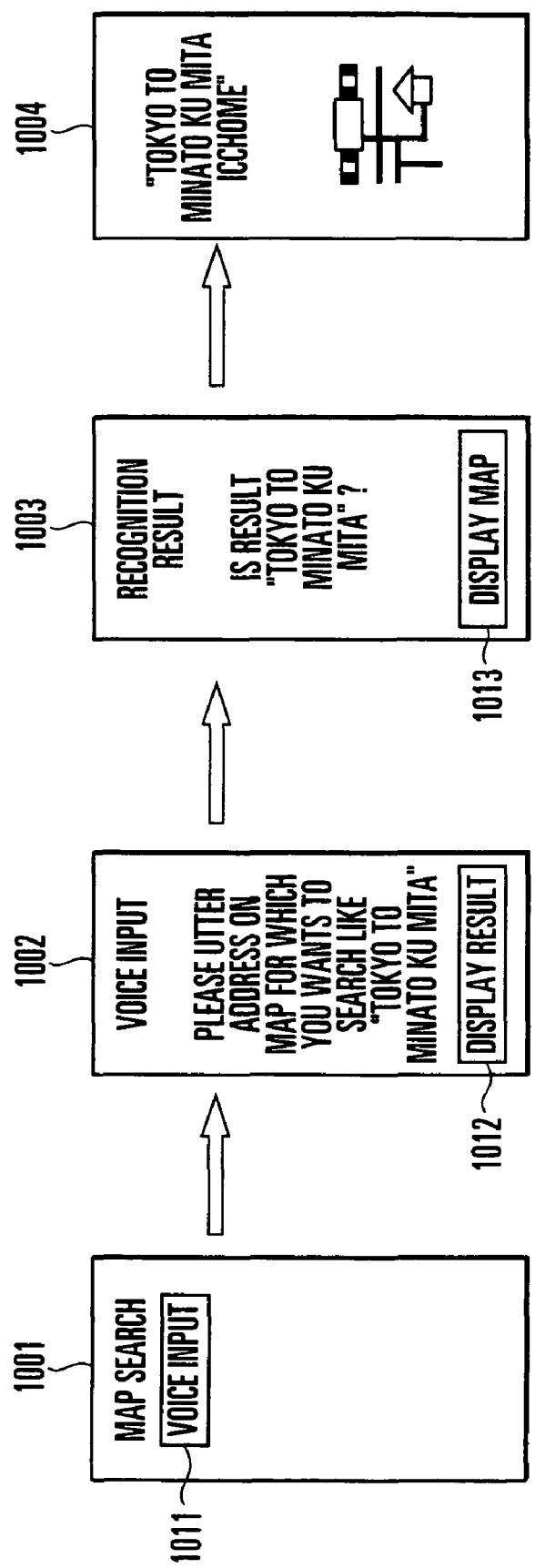
FIG. 15 is a view for explaining an example of transition to a window (page) displayed on the client according to the first specific example of the present invention.

The Web server 20 then downloads, to the client 10 which has issued the service request, the resultant information (e.g., the voice recognition identification result window on the window 1003 in FIG. 15) and a content (e.g., a map window on the window 1004 in FIG. 15) which are generated for each unique ID or only the content (e.g., the map window on the window 1004 in FIG. 15) (step S216), and the client 10 receives the downloaded information (step S117). The information is then displayed in a window on the client 10. The same download method as that used in the above specific example is used for the generated content information. This specific example can be used for various kinds of processing in, for example, the following cases:

- a case wherein the client 10 interacts with the voice processing server 30,
- a case wherein the voice processing server 30 performs a search or the like by using the voice processing result, or
- a case wherein the Web server 20 performs a search or the like by using the voice processing result.

Note that the processing to be performed by the client 10, Web server 20, and voice processing server 30, which is exemplified by FIG. 13, i.e., the functions of them, may be implemented by programs executed on computers forming the client 10, Web server 20, and voice processing server 30.

THIRD SPECIFIC EXAMPLE

Figure 11:
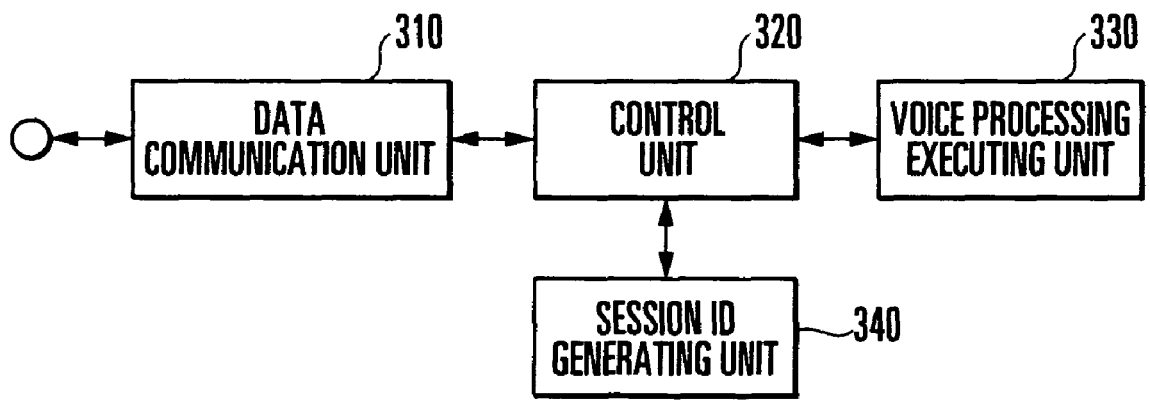
FIG. 11 is a view showing the arrangement of a voice processing server according to the third specific example of the present invention.

The third specific example of the present invention will be described next. In this specific example, the voice processing server 30 comprises a processing unit which generates a session ID. FIG. 11 is a view showing the arrangement of the voice processing server 30. Referring to FIG. 11, the voice processing server 30 according to this specific example is obtained by adding a session ID generating unit 340 to the voice processing server 30 shown in FIG. 8. The client 10 according to this specific example has the arrangement shown in FIG. 6, and the Web server 20 has the arrangement shown in FIG. 10. The operation of the specific example will be described below.

Figure 14:
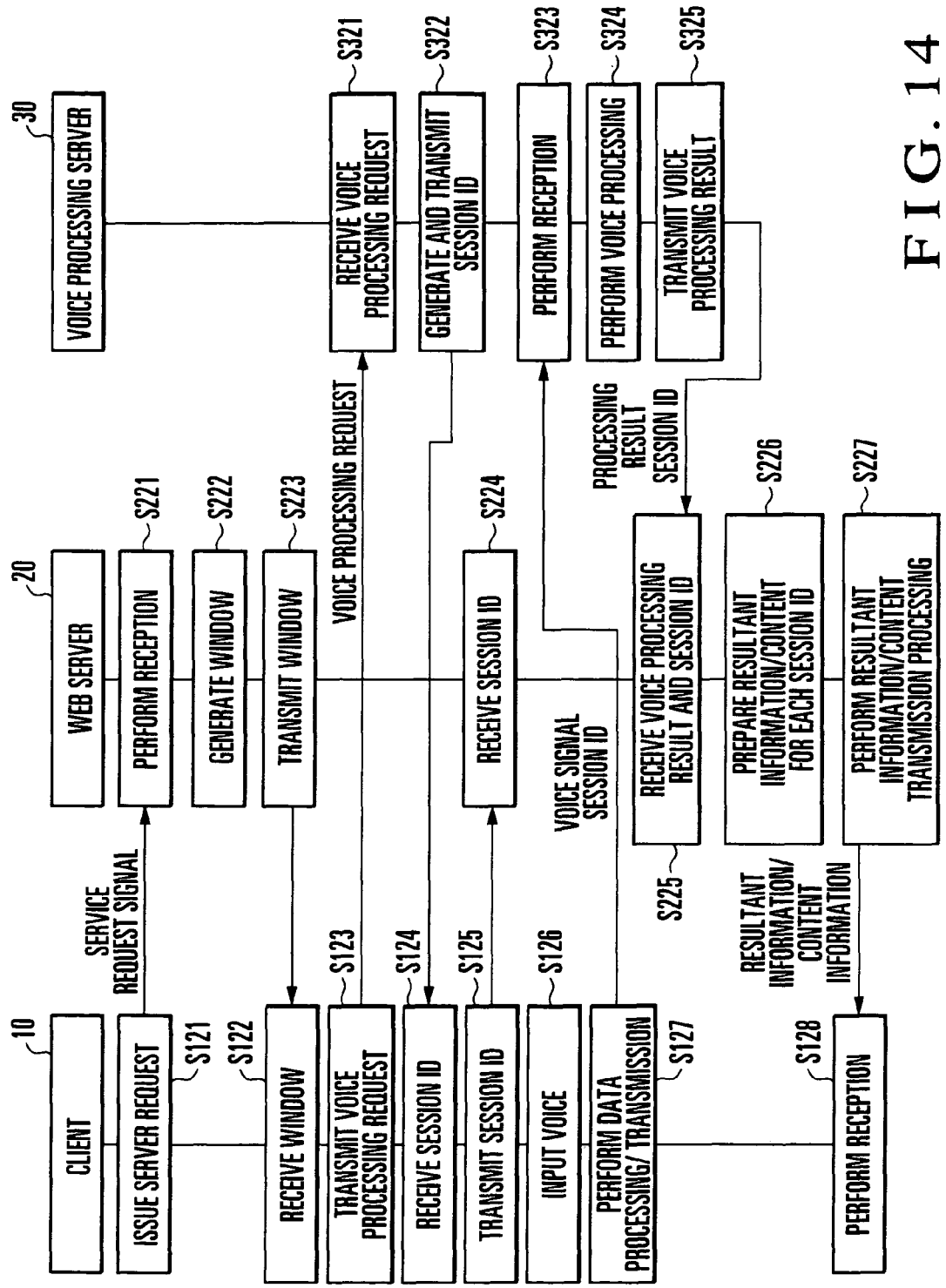
FIG. 14 is a view for explaining the operation of the third specific example of the present invention.

FIG. 14 is a view for explaining the sequence operation of this specific example. The specific example will be described with reference to FIGS. 6, 10, 11, and 14.

The client 10 issues a request for a service containing voice processing to the Web server 20 (step S121).

On the Web server 20 side, the data communication unit 210 receives the service request signal (step S221) and transmits the signal to the content management unit 220. The content management unit 220 receives the service request signal and generates a window for the requested service upon checking the service (step S222), and transmits (downloads) the window to the client 10 through the data communication unit 210 (step S223).

The client 10 receives the window information from the Web server 20 (step S122), and transmits a voice processing request signal to the voice processing server 30 to transmit the voice information to the voice processing server 30 (step S123).

In the voice processing server 30, the data communication unit 310 receives the voice processing request signal (step S321) and transmits the signal to the control unit 320. The control unit 320 transmits the voice processing request signal to the session ID generating unit 340.

The session ID generating unit 340 of the voice processing server 30 receives a session ID request signal and generates a session ID. The manner of generating a session ID is the same as that described in the above specific example.

The session ID generated by the session ID generating unit 340 of the voice processing server 30 is transmitted from the session ID generating unit 340 of the voice processing server 30 to the data communication unit 310 through the control unit 320.

The data communication unit 310 of the voice processing server 30 transmits the session ID to the client 10 (step S322).

The client 10 receives the session ID from the voice processing server 30 (step S124), and transmits the session ID to the control unit 120 through the data communication unit 130.

The session ID is then transmitted to the Web server 20 through the data communication unit 130 of the client 10 (step S125).

In the Web server 20, the data communication unit 210 receives the session ID (step S224), and transmits the session ID to the content management unit 220, thereby managing it.

After the client 10 notifies the Web server 20 of the session ID, the client 10 inputs the voice uttered by the user to the data input unit 110 (step S126), and transmits the voice to the control unit 120. The control unit 120 performs the same data processing as that in the above specific example. In this data processing, the session ID may be contained in the voice data.

The data communication unit 130 of the client 10 sequentially transmits the processed data to the voice processing server 30 (step S127).

In the voice processing server 30, the data communication unit 310 receives the data sequentially transmitted from the client 10 (step S323), and the control unit 320 determines that the received data is voice data, and transmits it to the voice processing executing unit 330.

The voice processing executing unit 330 comprises at least one of the following functions (not shown) required for voice processing (voice recognition, speaker collation, and the like) as in the above specific example: a recognition engine, recognition dictionary, synthesis engine, synthesis dictionary, and speaker collation engine, and sequentially performs voice processing (step S324). After the voice processing is complete, the voice processing executing unit 330 transmits the voice processing result to the data communication unit 310 through the control unit 320. The data communication unit 310 then transmits the result to the Web server 20 (step S325). The voice processing result is handled in the same manner as in the above specific example. At this point of time, the voice processing server 30 also transmits the session ID to the Web server 20. The session ID is transmitted in the same manner as in the above specific example.

In the Web server 20, the data communication unit 210 receives the voice processing result and the session ID (step S225), and transmits them to the content management unit 220. The voice processing result has the same contents as those in the above specific example. At this point of time, the voice processing server 30 transmits the session ID to the Web server 20 in the same manner as in the above specific example. In the Web server 20, the data communication unit 210 receives the voice processing result and session ID and transmits them to the content management unit 220.

The content management unit 220 of the Web server 20 generates information reflecting the voice processing result corresponding the session ID (content information corresponding to the voice processing resultant information and the voice processing result or content information corresponding to the voice processing result) for each session ID (step S226).

The Web server 20 then downloads, to the client which has issued a service request, the resultant information (e.g., the voice recognition identification result window on the window 1003 in FIG. 15) and a content (e.g., a map window on the window 1004 in FIG. 15) which are generated for each session ID or only the content (e.g., the map window on the window 1004 in FIG. 15) (step S226), and the client 10 receives the downloaded information from the Web server 20.

The generated content information may be downloaded by the following method. The client 10 executes the processing of setting the URL linked to the result acquisition button on the window downloaded to the client 10 to the URL contained in the session ID notified from the voice processing server 30 at the start of voice processing. The Web server 20 then places the content information reflecting the voice processing result at the URL contained in the session ID. With this operation, when the user presses the result acquisition button (e.g., "display map" button on the window 1003 in FIG. 15) on the client window, the content information reflecting the voice processing result is downloaded to the client 10.

As in the above specific example, this specific example can be used for various kinds of processing in, for example, the following cases:

a case wherein the client 10 interacts with the voice processing server 30, a case wherein the voice processing server 30 performs a search or the like by using the voice processing result, or a case wherein the Web server 20 performs a search or the like by using the voice processing result.

Note that the processing to be performed by the client 10, Web server 20, and voice processing server 30, which is exemplified by FIG. 14, i.e., the functions of them, may be implemented by programs executed on computers forming the client 10, Web server 20, and voice processing server 30.

[Operation Window]

An example of an operation window on the client 10 as a specific example to which the present invention is applied will be described next. FIG. 15 is a view showing an example of transition to a window (page) displayed on the window display unit 140 of the client 10 in the first specific example of the present invention in which sequence operation has been described with reference to FIG. 12. Window display on the client 10 in the first specific example of the present invention will be described below with reference to FIGS. 15 and 12.

<Window 1001>

A window 1001 is a window (the top page of "map search") downloaded from the Web server 20, in which a CGI (e.g., http:// . . . .jp/a.cgi) is linked to a "voice input" button 1011. When the user clicks the "voice input" button 1011 displayed on the window to issue a service request (corresponding to step S101 in FIG. 12), the Web server 20 activates a process (CGI program) called "a.cgi", and input information is transferred. The Web server 20 generates an HTML file on the basis of the processing result obtained by the CGI program and returns it as a response to the client 10.

<Window 1002>

A "voice input" window 1002 is displayed, and the message "please utter address on map for which you want to search like "Tokyo to minato ku mita" is displayed (which corresponds steps S102 to S104 in FIG. 12). An ID is embedded as a tag in the window. In this state of the window 1002, the user performs voice input (utterance). On the window, a page (http:// . . . /b.ID.html) is linked to a "display result" button 1012. When the user clicks the "display result" button 1012 on the window, the recognition result obtained by voice recognition performed by the voice processing server 30 is displayed as indicated by a next window 1003. Note that the recognition result window displayed on the window 1003 is the one downloaded from the Web server 20 to the client 10.

<Window 1003>

The "recognition result" window 1003 is displayed on the client 10 and the message "is result "Tokyo to minato ku mita" ?" is displayed. A "display map" button 1013 is display on the window.

<Window 1004>

When the user clicks the "display map" button 1013 on the window, content information is downloaded from the Web server 20 (which corresponds to step S106 in FIG. 12), and a map window (page) 1004 is displayed.

Note that in this specific example, it suffices to directly display the window 1004 as a result of the window 1002 without displaying the window 1003 as a recognition result window. That is, although the voice processing server 30 generates the window 1003 as a voice recognition result for each ID, the specific example may be configured to directly display the window 1004 in which a voice recognition result is reflected by clicking the "display result" button 1012 on the window 1002 (in this case, the window 1003 in FIG. 15 is omitted).

Although FIG. 15 and FIG. 16 to be described below each show an example of a window for a map guidance system based on voice input, it is obvious that the present invention is not limited to such a system, and can be applied to arbitrary utterance management.

Figure 16:
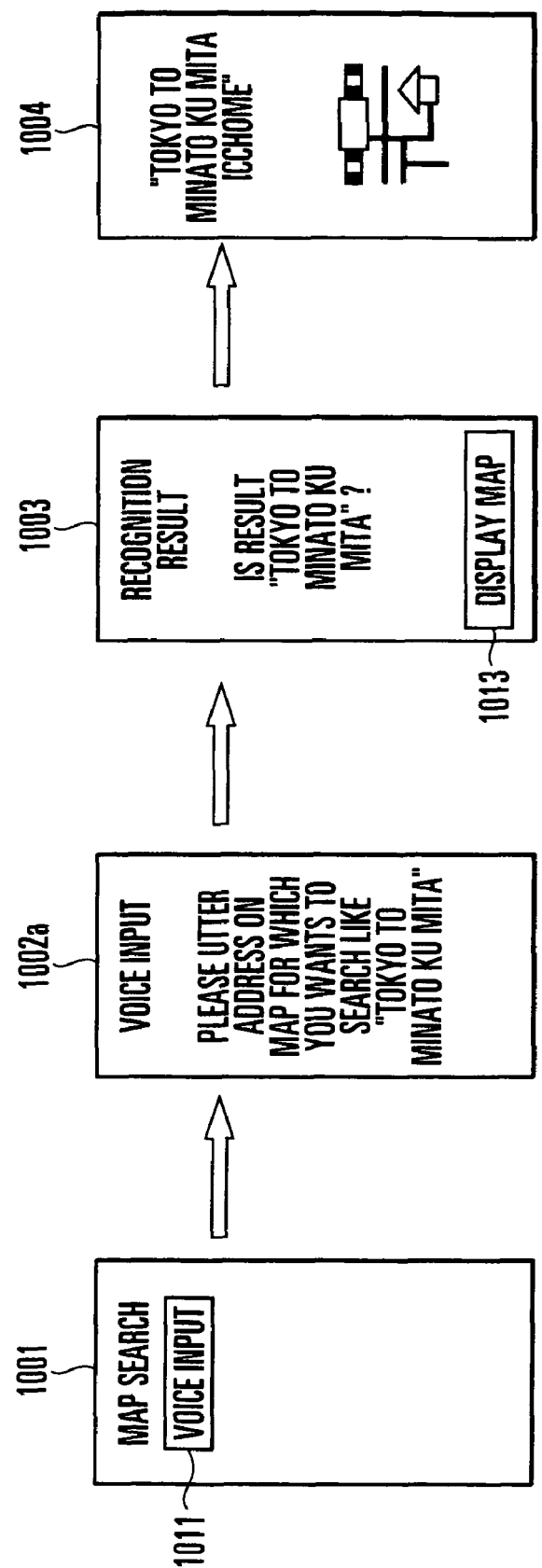
FIG. 16 is a view for explaining another example of transition to a window (page) displayed on the client according to the first specific example of the present invention.

FIG. 16 is a view showing a modification of FIG. 15. On a window 1002a shown in FIG. 16, the "display result" button 1012 on the window 1002 in FIG. 15 is not displayed. In the example shown in FIG. 16, when voice input is performed on the window 1002a, the recognition result window 1003 is displayed without clicking the "display result" button 1002a on the window such as the window 1002 in FIG. 15. When the user clicks the "display map" button 1013, the map of the window 1004 is displayed. Alternatively, performing voice input on the window 1002a directly displays a map on the window 1004 without displaying the window 1003.

When a window is prepared for each ID (step S206 in FIG. 12), the Web server 20 transmits the URL information of the window to the client 10. The client 10 automatically access the received URL information. As a consequence, the windows 1003 and 1004 shown in FIGS. 15 and 16 are displayed.

The procedure of processing in a case wherein the user continuously utters voice on the client 10 in the specific example of the present invention will be described next. For example, when the user continuously utter voice, a "voice re-input" button or the like may be generated in advance on a window 1004 in FIG. 15 or 16. Linking the URL of a CGI of a Web server to the "voice re-input" button on the window 1004 makes it possible to generate a new ID when the user clicks the "voice re-input" button on the window 1004, thereby allowing the user to perform voice re-input operation.

Alternatively, a "to top page" button may be generated in advance on the window 1004 in FIG. 15 or 16. When the user clicks the "to top page" button on the window 1004, the page returns to the page of the window 1001 in FIG. 15 or 16. This makes it possible to perform the process of "voice input" again.

Obviously, it suffices to take countermeasures such as using passwords or cryptography (public key cryptography) as security measures such as security protection for security IDs and unique IDs transferred between the client 10, the Web server 20, and the voice processing server 30.

The present invention has been described with reference to the above specific examples. Obviously, however, the present invention is not limited to only the arrangements of the above specific examples, and incorporate various modifications and improvements made by those skilled in the art within the spirit and scope of the invention.

INDUSTRIAL APPLICABILITY

The present invention is applicable to a service providing system which causes a client to display a window, issue a request by voice, and display the result. More specifically, for example, the present invention can be suitably applied to a service of displaying a map in accordance with an address uttered in voice;

a service of displaying a manual in accordance with a sentence to be searched for which is uttered in voice; and a service of downloading a tune in accordance with the tile of the tune uttered in voice.

In addition, the present invention allows transmission/reception of data through a packet network, and hence allows the user of a portable digital assistant (PDA), PC, on-vehicle terminal, home terminal, and the like as clients as well as a cell phone terminal.

The invention claimed is:

1. A voice processing system comprising:
a terminal which transmits input voice information and outputs received information;
a voice processing unit which performs voice processing on the basis of voice information from said terminal; and
an information providing unit which receives a voice processing result obtained by said voice processing unit and transmits information reflecting the voice processing result to said terminal;
wherein one of said information providing unit and said voice processing unit generates, for each session, processing identification information corresponding to a series of processes performed by said voice processing unit and said information providing unit on the basis of the voice information;
wherein said terminal, said voice processing unit and said information providing unit share the processing identification information; and
wherein said information providing unit transmits information reflecting the voice processing result to said terminal on the basis of the processing identification information without said information reflecting the voice processing result passing through said voice processing unit.

2. A voice processing system according to claim 1, wherein said voice processing unit comprises voice processing executing means for performing at least one of voice recognition processing, interaction processing, and collation processing as the voice processing.

3. A voice processing system according to claim 1, wherein one of said information providing unit and said voice processing unit further comprises communication means for transmitting the generated processing identification information to said terminal.

4. A voice processing system according to claim 3, wherein said terminal comprises communication means for receiving the processing identification information generated by one of said information providing unit and said voice processing unit and transmitting the received processing identification information to the other of said information providing unit and said voice processing unit.

5. A voice processing system according to claim 3, wherein said terminal comprises communication means for receiving the processing identification information generated by said identification information generating means of said information providing unit and transmitting the received processing identification information to said voice processing unit together with the input voice information.

6. A voice processing system according to claim 1, wherein said terminal comprises communication means for transmitting the processing identification information to said voice processing unit together with the input voice information, and said voice processing unit comprises
reception means for receiving the voice information and the processing identification information from said terminal,
voice processing executing means for executing voice processing for the received voice information, and
transmission means for transmitting the processing identification information to said information providing unit upon containing the information in a voice processing result obtained by said voice processing executing means.

7. A voice processing system according to claim 1, wherein said terminal comprises communication means for transmitting a transmission packet having the processing identification information stored in a header portion to said voice processing unit.

8. A voice processing system according to claim 1, wherein said information providing unit comprises
reception means for receiving, together with the processing identification information, a voice processing result obtained by said voice processing unit,
information management means for preparing resultant information reflecting the voice processing result, in correspondence with the processing identification information, and
transmission means for transmitting the resultant information to said terminal, and
said terminal comprises output means for outputting the resultant information from said information providing unit.

9. A voice processing system according to claim 1, wherein said information providing unit comprises
reception means for receiving, together with the processing identification information, a voice processing result obtained by said voice processing unit,
information management means for preparing content information reflecting the voice processing result, in correspondence with the processing identification information, and
transmission means for transmitting the content information to said terminal, and
said terminal comprises output means for outputting the content information from said information providing unit.

10. A voice processing system according to claim 1, wherein said information providing unit comprises
first reception means for receiving, together with the processing identification information, a voice processing result obtained by said voice processing unit, and
information management means for placing content information reflecting the voice processing result in a place represented by URL (Uniform Resource Locator) information containing the processing identification information, and
first transmission for transmitting the content information corresponding to the URL information designated by said terminal to said terminal.

11. A voice processing system according to claim 10, wherein said information providing unit further comprises
second transmission means for transmitting recognition resultant information corresponding to input voice which reflects the voice processing result to said terminal, and
third transmission means for transmitting, to said terminal, the content information corresponding to the URL information designated by said terminal which has received the recognition resultant information.

12. A voice processing system according to claim 1, wherein the voice information is at least one of digitalized voice data, compressed voice data, and a feature vector.

13. A voice processing system according to claim 1, wherein
said terminal, said voice processing unit, and said information providing unit are respectively a client, a voice processing server, and an information providing server which are communication-connected to each other,
said client comprises
first transmission means for transmitting a service request signal to said information providing server when a service request is issued,
reception means for receiving the processing identification information transmitted from said information providing server as a response to the service request signal, and
second transmission means for transmitting the input voice information to said voice processing server together with the processing identification information,
said voice processing server comprises
reception means for receiving the voice information and the processing identification information from said client,
voice processing executing means for executing voice processing for the received voice information, and
transmission means for transmitting a voice processing result obtained by said voice processing executing means and the processing identification information to said information providing server, and
said information providing server comprises
reception means for receiving the service request signal from said client and the voice processing result and the processing identification information from said voice processing server,
said identification information generating means for generating the processing identification information when the service request signal is received,
information management means for generating information to be presented to said client on the basis of the processing identification information generated by said identification information generating means, and generating information reflecting the voice processing result in correspondence with the processing identification information from said voice processing server, and
transmission means for transmitting the generated processing identification information and the information to said client.

14. A voice processing system according to claim 1, wherein
said terminal, said voice processing unit, and said information providing unit are respectively a client, a voice processing server, and an information providing server which are communication-connected to each other,
said client comprises
first transmission means for transmitting a service request signal to said information providing server when a service request is issued,
second transmission means for transmitting a voice processing request signal to said voice processing server,
reception means for receiving the processing identification information transmitted from said voice processing server as a response to the voice processing request signal,
third transmission means for transmitting the received processing identification information to said information providing server, and
fourth transmission means for transmitting the input voice information to said voice processing server together with the processing identification information,
said voice processing server comprises
first reception means for receiving the voice processing request signal from said client,
said identification information generating means for generating the processing identification information when the voice processing request signal is received, first transmission means for transmitting the generated processing identification information to said client, second reception means for receiving the voice information and the processing identification information from said client, voice processing executing means for executing voice processing for the voice information from said client, and transmission means for transmitting a voice processing result obtained by said voice processing executing means and the processing identification information from said client to said information providing server, and said information providing server comprises reception means for receiving the service request signal and the processing identification information from said client and the voice processing result and the processing identification information from said voice processing server, information management means for generating information to be presented to said client on the basis of the service request signal from said client and generating information reflecting the voice processing result in correspondence with the processing identification information from said voice processing server, and transmission means for transmitting the information generated by said information management means to said client.

15. A voice processing method comprising the steps of:

causing a terminal to transmit input voice information to a voice processing unit;

causing the voice processing unit to perform voice processing for the voice information from the terminal;

transmitting a voice processing result to an information providing unit; and causing the information providing unit to prepare information reflecting the voice processing result obtained by the voice processing unit; and transmitting the prepared information reflecting the voice processing result to the terminal, wherein one of said information providing unit and said voice processing unit generates, for each session, processing identification information corresponding to a series of processes performed by said voice processing unit and said information providing unit on the basis of the voice information;

wherein said terminal, said voice processing unit and said information providing unit share the processing identification information: and wherein said information providing unit transmits information reflecting the voice processing result to said terminal on the basis of the processing identification information without said information reflecting the voice processing result passing through said voice processing unit.

16. A voice processing method according to claim 15, wherein the terminal, the voice processing unit, and the information providing unit are respectively a client, a voice processing server, and an information providing server which are communication-connected to each other, and the method comprises the steps of;

causing the client to transmit a service request signal to the information providing server, causing the information providing server to generate the processing identification information when receiving the service request signal, generating information to be presented to the client on the basis of the processing identification information, and transmitting the generated processing identification information and the information to the client, causing the client to transmit the input voice information to the voice processing server together with the processing identification information from the information providing server, causing the voice processing server to perform voice processing for the voice information from the client, and transmitting a voice processing result and the processing identification information from the client to the information providing server, and causing the information providing server to prepare, in correspondence with the processing identification information from the voice processing server, information reflecting the voice processing result obtained by the voice processing server, and transmitting the prepared information to the terminal.

17. A voice processing method according to claim 15, wherein the terminal, the voice processing unit, and the information providing unit are respectively a client, a voice processing server, and an information providing server which are communication-connected to each other, and the method comprises the steps of causing the client to transmit a service request signal and the processing identification information to the information providing server, causing the information providing server to generate information to be presented to the client on the basis of the processing identification information when receiving the service request signal and the processing identification information, and transmitting the generated information to the client, causing the client to transmit the input voice information to the voice processing server together with the processing identification information after receiving the information from the information providing server, causing the voice processing server to perform voice processing for the voice information from the client, and transmitting a voice processing result and the processing identification information from the client to the information providing server, and causing the information providing server to prepare, in correspondence with the processing identification information from the voice processing server, information reflecting the voice processing result obtained by the voice processing server, and transmitting the prepared information to the terminal.

18. A voice processing method according to claim 15, wherein the terminal, the voice processing unit, and the information providing unit are respectively a client, a voice processing server, and an information providing server which are communication-connected to each other, and the method comprises the steps of causing the client to transmit a service request signal to the information providing server, causing the information providing server to generate information to be presented to the client when receiving the service request signal, and transmitting the generated information to the client, causing the client to transmit a voice processing request signal to the voice processing server, causing the voice processing server to generate the processing identification information when receiving the voice processing request signal, and transmitting the processing identification information to the client, causing the client to receive the processing identification information from the voice processing server and transmit the processing identification information to the information providing server, and transmitting the input voice information to the voice processing server together with the processing identification information, causing the voice processing server to perform voice processing for the voice information from the client, and transmitting a voice processing result and the processing identification information from the client to the information providing server, and causing the information providing server to prepare, in correspondence with the processing identification information from the voice processing server, information reflecting the voice processing result obtained by the voice processing server, and transmitting the prepared information to the terminal.

19. An information providing server unit comprising:

first reception means for receiving a service request signal from a client;

identification information generating means for generating, for each session, processing identification information corresponding to a series of processes performed on the basis of voice information from said client when the service request signal is received;

means for generating first information to be presented to said client on the basis of the processing identification information;

first transmission means for transmitting the processing identification information and the first information to said client;

second reception means for receiving a voice processing result and the processing identification information from a voice processing server which performs voice processing upon receiving the voice signal and the processing identification information from said client;

means for generating second information reflecting the voice processing result in correspondence with the processing identification information from the voice processing server; and second transmission means for transmitting, the second information to said client.

20. A voice processing server unit comprising:

first reception means for receiving a voice processing request signal from a client;

identification information generating means for generating, for each session, processing identification information corresponding to a series of processes performed on the basis of voice information from said client when the voice processing request signal is received;

first transmission means for transmitting the processing identification information to said client;

second reception means for receiving the voice information and the processing identification information from said client;

voice processing executing means for performing voice processing for the voice information from said client; and transmission means for transmitting, to an information providing server, a voice processing result obtained by said voice processing executing means and the processing identification information from said client, while generating information reflecting the voice processing result in correspondence with the processing identification information.

21. A program which causes a computer serving as an information providing server unit to implement:

a first reception function of receiving a service request signal from a client;

an identification information generating function of generating, for each session, processing identification information corresponding to a series of processes performed on the basis of voice information from the client when the service request signal is received;

a function of generating first information to be presented to the client on the basis of the processing identification information;

a first transmission function of transmitting the processing identification information and the first information to the client;

a second reception function of receiving the voice signal and the processing identification information from the client and receiving a voice processing result and the processing identification information from a voice processing server which performs voice processing;

a function of generating second information reflecting the voice processing result in correspondence with the processing identification information from the voice processing server; and a second transmission function of transmitting the second information to the client.

22. A program which causes a computer serving as a voice processing server unit to implement:

a first reception function of receiving a voice processing request signal from a client;

an identification information generating function of generating, for each session, processing identification information corresponding to a series of processes performed on the basis of voice information from the client when the voice processing request signal is received;

a first transmission function of transmitting the processing identification information to the client;

a second reception function of receiving the voice information and the processing identification information from the client;

a voice processing execution function of executing voice processing for the voice information from the client; and a transmission function of transmitting, to an information providing server, a voice processing result obtained by the voice processing execution function and the processing identification information from the client, while generating information reflecting the voice processing result in correspondence with the processing identification information.

23. An information processing system comprising a client and a plurality of servers, wherein a series of processes (A), (B), and (C):

(A) in association with processing executed by at least one of said plurality of servers on the basis of a request from said client, processing is performed by another server in accordance with the request, (B) exchanging a processing result between said another server and said one server, and (C) causing said one server to generate response information in response to the request on the basis of the processing result, are managed by common processing identification information shared by said client, said one server, and said another server, and the processing identification information is generated, for each session, by one of said one server and said another server, wherein said one server transmits information reflecting the processing result to said client on the basis of the processing identification information without said information reflecting the processing result passing through said another server.

24. An information processing system according to claim 23, wherein said one server comprises a Web server, and said another server comprises a voice processing server which performs voice processing, and voice uttered by a user which is input to said client is managed by the processing identification information.

* * * * *